United States Patent
Brissette et al.

(10) Patent No.: US 6,761,237 B2
(45) Date of Patent: Jul. 13, 2004

(54) QUICK CONNECT/DISCONNECT DRIVELINE ASSEMBLY

(75) Inventors: Ronald N. Brissette, Lake Orion, MI (US); Anthony Lentini, St. Clair Shores, MI (US); Chris Steele, Lake Orion, MI (US); John P. Remelius, Henderson, NC (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/041,442

(22) Filed: Jan. 8, 2002

(65) Prior Publication Data

US 2003/0130047 A1 Jul. 10, 2003

(51) Int. Cl.⁷ .............................................. B62D 61/10
(52) U.S. Cl. .................... 180/24.12; 464/134; 464/901; 475/246
(58) Field of Search ................................ 464/134, 178, 464/901; 475/222, 246, 247; 74/607; 180/378, 905, 24.09, 24.11, 24.12; 301/137

(56) References Cited

U.S. PATENT DOCUMENTS

| | | |
|---|---|---|
| 399,572 A | 1/1889 | Jenkinson |
| 639,178 A | 12/1899 | Maddox |
| 1,389,042 A | 8/1921 | Garman |
| 2,107,721 A | 2/1938 | Swenson |
| 2,116,290 A | 5/1938 | Spicer |
| 2,680,634 A | 6/1954 | Haworth |
| 2,706,125 A | 4/1955 | Morley |
| 3,029,888 A | * 4/1962 | Tapp ........................ 180/24.11 |
| 3,041,857 A | 7/1962 | Anderson |
| 3,318,173 A | * 5/1967 | Puidokas ................. 475/246 X |
| 3,323,844 A | * 6/1967 | Hedstrom ............... 475/246 X |
| 3,367,138 A | * 2/1968 | Tiedeman ............... 464/901 X |
| 3,367,142 A | 2/1968 | Groves et al. |
| 3,400,558 A | 9/1968 | Haines |
| RE27,068 E | 2/1971 | Groves |
| 3,706,350 A | * 12/1972 | Bokovoy .................. 180/24.09 |
| 3,760,920 A | 9/1973 | Delfeld |
| 3,905,089 A | * 9/1975 | Osenbaugh et al. .... 475/246 X |
| 4,203,306 A | 5/1980 | Sehlbach et al. |
| 4,365,909 A | * 12/1982 | Stephan |
| 4,475,737 A | 10/1984 | Cook, Jr. et al. |
| 4,754,847 A | * 7/1988 | Glaze et al. |
| 5,609,540 A | * 3/1997 | Brissenden et al. ...... 475/222 X |
| 6,189,413 B1 | * 2/2001 | Morse et al. .................. 74/607 |
| 2003/0050126 A1 | * 3/2003 | Arnold ........................ 464/178 |

* cited by examiner

Primary Examiner—Greg Binda
(74) Attorney, Agent, or Firm—Carlson, Gaskey & Olds (57) ABSTRACT

A driveline assembly includes a shaft that is rotatably supported on a bearing assembly within a drive axle. The shaft has a first mount portion with a threaded exterior surface and a second mount portion with a splined exterior surface. A retaining ring is threaded onto the first mount portion to engage and retain the bearing assembly at a proper location. A yoke member with a splined inner bored is mounted on the shaft in engagement with the splined exterior surface. The yoke member can easily be connected and disconnected from the shaft without having to remove the retaining ring. The yoke member also includes a quick disconnect device that simplifies removal and re-assembly of the yoke member from the shaft.

17 Claims, 7 Drawing Sheets

QUICK CONNECT/DISCONNECT DRIVELINE ASSEMBLY

BACKGROUND OF THE INVENTION

This invention relates to a quick connect/disconnect driveline assembly for facilitating service, repair, and change-out operations that occur over the life of the driveline. Specifically, the invention includes a retaining ring for engaging and retaining a bearing at a proper location on a shaft while allowing a yoke member to be separately mounted on the shaft. The yoke member can be connected and disconnected without having to remove the retaining ring.

Most vehicle drivelines include drive axles that are connected to a driveshaft or other driveline component with a universal joint. The drive axle can be either a single drive axle coupled to the driveshaft or a tandem axle assembly including a forward-rear axle that is coupled to the driveshaft and a rear-rear axle that is connected to the forward-rear axle via an interaxle driveshaft. Universal joints provide connections between the axles and the driveshafts.

The universal joint allows two shaft components to be oriented at different angles relative to each other to accommodate relative movement and angular misalignment while transmitting torque. The universal joint connections are used to interconnect driveline components that are not mounted to the vehicle in a straight line.

For example, the driveshaft powered by a vehicle engine provides input, via a transmission, to a center gear assembly of the single drive axle. The center differential has an input pinion shaft that is coupled to the driveshaft with a universal joint assembly. In another example, the driveshaft provides input to the tandem axle having the forward-rear axle connected to the rear-rear axle with the interaxle driveshaft. The forward-rear axle has an input pinion shaft coupled to the driveshaft and an output thru-shaft coupled to the interaxle driveshaft. The rear-rear axle has an input pinion shaft that is coupled to the interaxle driveshaft. Universal joint assemblies connect both axles to the interaxle driveshaft as well as connecting the driveshaft to the input pinion shaft of the forward-rear axle.

The universal joints typically include a pair of yoke members. One yoke member is supported on a shaft (i.e., the input pinion shaft and/or the output thru-shaft) operably connected to one of the axles and the mating yoke member is supported on the driveshaft or interaxle driveshaft. Bearing assemblies are mounted within the axles to rotatably support the input pinion shafts and the output thru-shaft. Typically the yoke members, which are supported on the input pinion shafts and the output thru-shafts, have a hub portion that slides over the shaft abuts against the bearing assembly. A nut is then threaded on the shaft and tightened to hold the yoke member securely against the bearing assembly.

In some applications, the nut is tightened to hold the yoke member securely against the bearing assembly to properly retain and position the bearing assembly on the appropriate shaft. In a tandem axle configuration, the yoke members are installed on the output thru-shaft and the input pinion shaft to the rear-rear axle and the respective nuts are tightened against the yoke members to retain the bearings. The interaxle driveshaft is then installed between the forward-rear axle and the rear-rear axle. The interaxle driveshaft is a two-piece telescoping shaft that is collapsed to a shorter length, inserted between the axles and then expanded to the desired length for attachment to the yoke members on the thru-shaft and input pinion shaft to the rear-rear axle. This installation processes is difficult and time consuming. Thus, it would be desirable to simplify the installation process of the yoke members on the shafts and the connection of the axles to the interaxle driveshaft.

In other applications, the nut is tightened to a predetermined torque level to provide a preload force for the bearing assembly. Sometimes, a preload force is required for the bearing assembly to operate and wear properly. This configuration is susceptible to having inconsistent torque applied to the nut due to the necessity of removing and reinstalling the yoke member for service. In other words, once a yoke member is removed for service, the preload force needs to be re-applied to the bearing assembly. When the yoke member is re-installed, the nut can be over or under-tightened resulting in an improper bearing preload force, which can lead to diminished performance, increased noise, accelerated wear, and pre-mature failure. This situation can occur when the yoke members are removed for repair, replacement, and/or when the yokes members are changed-out to accommodate greater or lesser load carrying capacities. Further, the process of removing and re-installing the yoke members and associated retaining nuts is time consuming.

For the above reasons, it would be desirable to simplify the assembly process for connecting and disconnecting yoke members and to eliminate the need to re-apply bearing preload forces after driveline service to avoid premature wear and failure in addition to overcoming other deficiencies in the prior art as outlined above.

SUMMARY OF THE INVENTION

A driveline assembly includes a first shaft that is supported on a bearing assembly for rotation within a drive axle. The shaft includes a first mounting portion and a second mounting portion. A retaining ring is installed on the first mounting portion to engage and retain the bearing assembly at a proper position along the shaft. A yoke member is installed on the second mounting portion for connecting the first shaft to a second shaft. To simplify service and assembly, the yoke member can be removed without having to remove the retaining ring from the shaft. Additionally, the yoke member can be re-installed without affecting the retaining ring.

In the preferred embodiment, the first mounting portion comprises a threaded surface on one portion of the shaft and the second mounting portion comprises a splined surface on another portion of the shaft. The retaining ring includes a threaded inner bore that installed in threaded engagement with the threaded surface on the shaft. The yoke member includes a splined inner bore that mates with the splined surface on the shaft.

Preferably, the yoke member includes a quick connect/disconnect device that permits the yoke member to be easily removed for repair, replacement, or change-out. The device includes components that are easily directed between connect and disconnect conditions. In one embodiment, the device includes at least one longitudinally extending slot formed in the body of the yoke member and at least one laterally extending thru-hole. To connect the yoke member to the shaft a clamping member is inserted into the thru-hole and applies a clamping force on opposing edges of the slot to clamp the yoke member to the shaft. To disconnect the yoke member, the clamping force is released.

In another embodiment, the device includes a laterally extending hole in communication, through a small opening, with the splined inner bore of the yoke member. To connect the yoke member to the shaft, a spring loaded pin is biased to engage an edge of the small opening to retain the yoke member on the shaft. To disconnect the yoke member, the spring loaded pin is depressed to disengage the edge of the small opening to permit removal of the yoke member from the shaft.

In some applications, the retaining ring is tightened against the bearing assembly to a predetermined torque level to achieve a predetermined bearing preload. The yoke member is then installed on the shaft. The yoke member is removable from the shaft without having to remove the retaining ring. Thus, the bearing preload force is not affected during driveline maintenance.

The drive axle can be a single drive axle or a tandem drive axle assembly. In the single drive axle configuration, the shaft that supports the retaining ring and yoke member is an input pinion shaft. The pinion shaft supports a pinion gear that is in driving engagement with a center gear assembly in the drive axle. The retaining ring is positioned on the pinion shaft between the yoke member and the pinion gear.

In the tandem drive axle assembly configuration, the assembly includes a forward-rear axle and a rear-rear axle that are interconnected via an interaxle driveshaft. The shaft that supports the retaining ring and yoke member is preferably an output thru-shaft from the forward-rear axle. The thru-shaft is driven by a center gear assembly of the forward-rear axle and is coupled to the interaxle driveshaft. Optionally, or in addition to, the input pinion shaft to the rear-rear axle can also include a yoke member and retaining ring as described above in reference to the single drive axle.

In the preferred embodiment for the tandem axle configuration, the interaxle driveshaft is fixed in length. The yoke member is splined to the thru-shaft of the forward rear axle, as described above, for sliding adjustment along the thru-shaft. Preferably, the interaxle driveshaft is a single piece component that is used in combination with the sliding yoke member to provide variable length adjustment on the thru-shaft.

The subject invention simplifies assembly of driveline components in addition to improving performance. These and other features of the present invention can be best understood from the following specifications and drawings, the following of which is a brief description.

DETAILED DESCRIPTION OF A PREFERRED EMBODIMENT

Figure 1A:
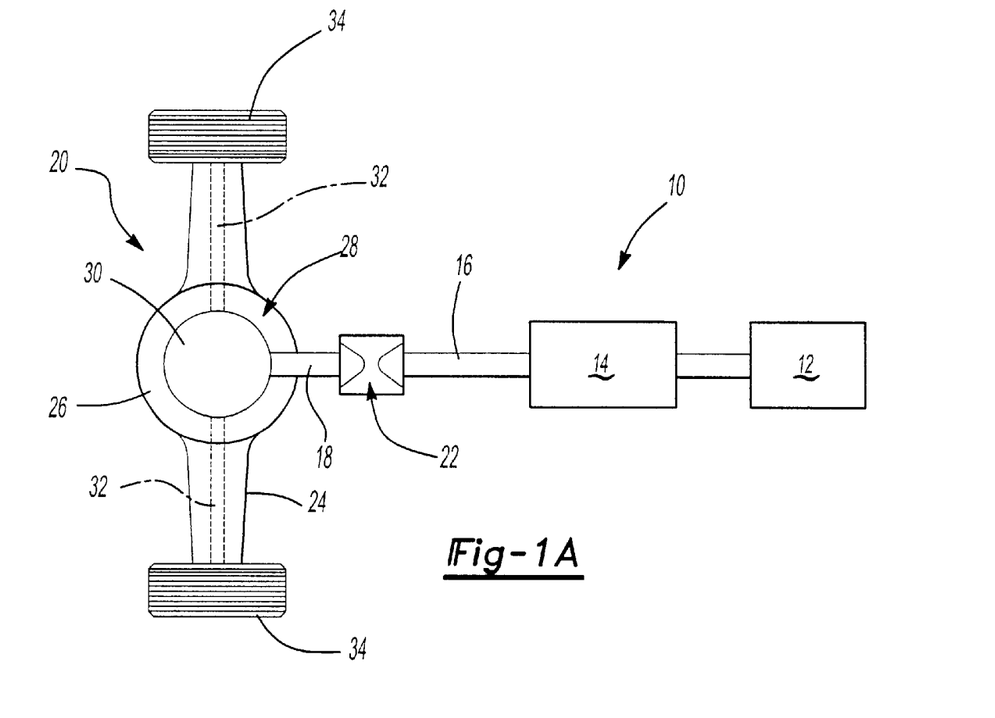
FIG. 1A is a schematic view of a driveline assembly with a single drive axle.

A vehicle driveline assembly 10 with a single rear drive axle is shown in FIG. 1A. An engine 12 and transmission 14 provide a driving output torque to an input driveshaft 16. The driveshaft 16 is coupled to an input pinion shaft 18 for a drive axle 20 with a universal joint 22. The drive axle 20 includes an axle housing 24 that defines a bowl 26 for a carrier 28. The carrier 28 preferably includes a differential gear assembly 30 that splits rotational input torque from the longitudinally extending input shaft 18 into input torque for a pair of laterally extending axle shafts 32. The axle shafts 32 are coupled to wheels 34 that drive the vehicle.

Figure 1B:
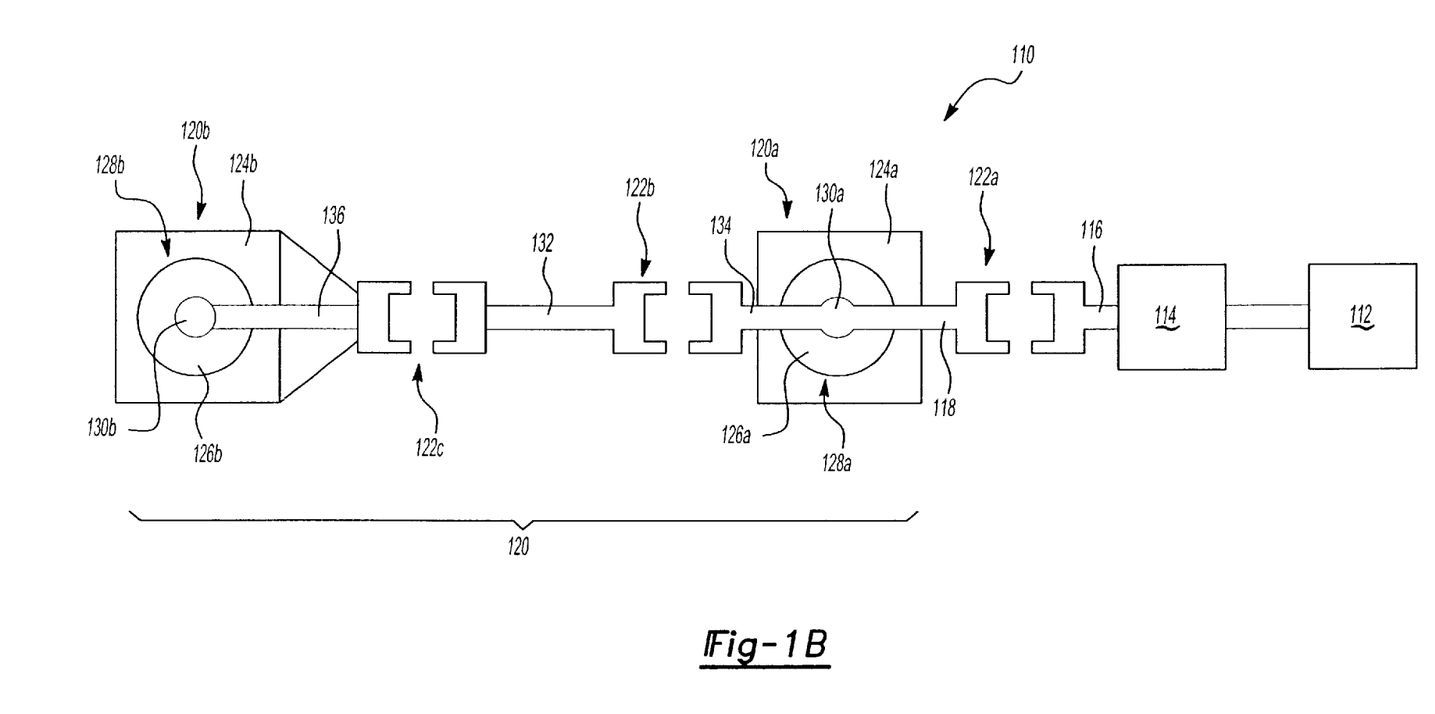
FIG. 1B is a schematic view of a driveline assembly with a tandem drive axle.

An alternate embodiment of a driveline assembly 110 with a tandem drive axle is shown in FIG. 1B. An engine 112 and transmission 114 provide driving torque to an input driveshaft 116. The driveshaft 116 is coupled to an input shaft 118 for a tandem drive axle 120 with a first universal joint assembly 122a.

The tandem drive axle 120 includes a forward-rear axle 120a and a rear-rear axle 120b that are coupled together with an interaxle driveshaft 132. The forward-rear axle 120a includes an axle housing 124a that defines a bowl 126a for a carrier or differential 128a. The carrier 128a includes a differential gear assembly 130a that splits torque from the input pinion shaft 118 into torque for the forward-rear and rear-rear drive axles. Each axle similarly drives axle shafts in a manner as shown in FIG. 1A.

The rear-rear axle 120b includes an axle housing 124b that defines a bowl 126b for a carrier or differential 128b. The carrier 128b includes a differential gear assembly 130b that splits torque from the interaxle driveshaft 132 into torque for driving axle shafts in a similar manner as shown in FIG. 1A and as noted above. An output thru-shaft 134 from the forward-rear axle 120a is coupled to the interaxle driveshaft 132 with a second universal joint assembly 122b. A third universal joint assembly 122c couples the opposite end of the interaxle driveshaft 132 to an input pinion shaft 136 of the rear-rear-axle 120b.

Figure 2:
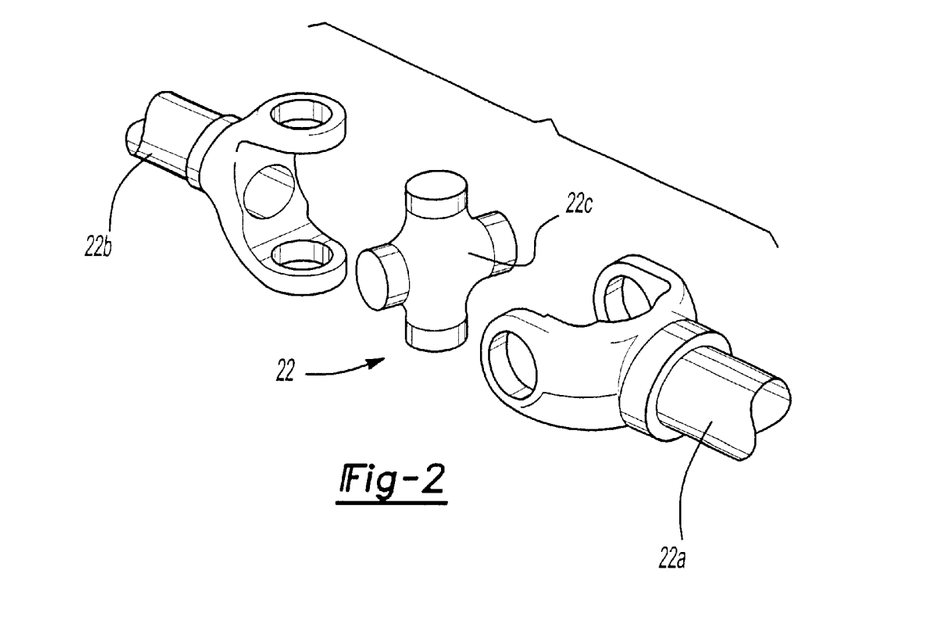
FIG. 2 is a schematic view of a known universal joint assembly.

Typically universal joints 22, 122 include a pair of yoke members 22a, 22b, interconnected by a center cross 22c, as shown in FIG. 2. One yoke member 22a is supported on one of the input shafts, i.e. the input pinion shaft 18, 118, 136 and/or the output thru-shaft 134 and the mating yoke member 22b is supported on the driveshaft 16, 116, or interaxle driveshaft 132. Bearing assemblies 40 are mounted within the axles 20, 120a, 120b to rotatably support the input pinion shafts 18, 118, 136 and the output thru-shaft 134. The operation of universal joints is well known in the art and will not be discussed in detail.

Figure 3:
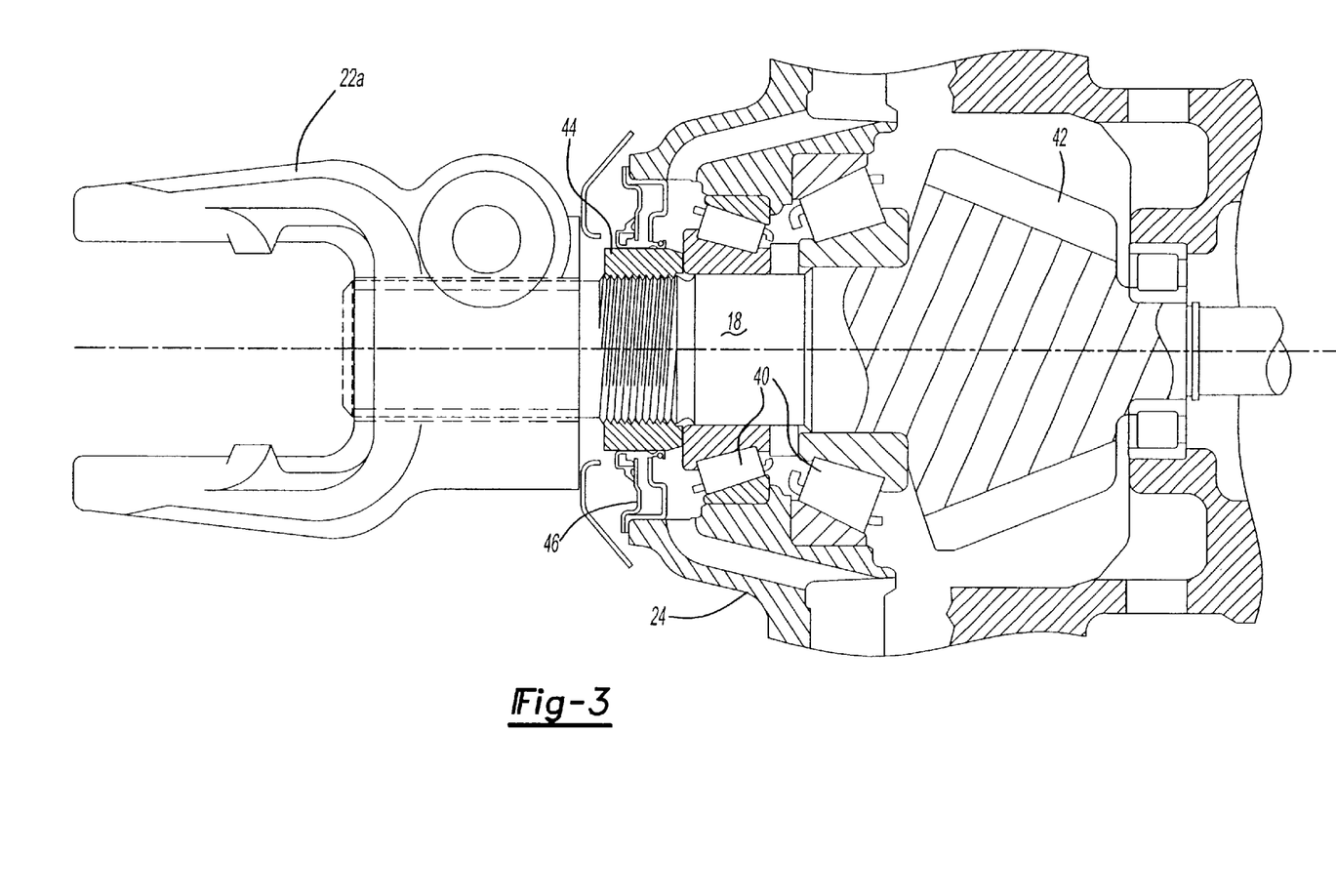
FIG. 3 is a cross-sectional view, partially broken away, of a driveline assembly incorporating the subject invention.

In a single rear drive axle configuration as shown in FIG. 3, the input pinion shaft 18 supports a pinion gear 42 that drivingly engages the gear assembly 30. The bearing assembly 40 supports the input pinion shaft 18 for rotation relative to the axle housing 24. A retaining ring 44 engages and retains the bearing assembly 40 on the shaft 18. The yoke member 22a is then separately installed on the shaft 18. A seal 46 is installed between the retaining ring 44 and a portion of the axle housing 24 to prevent contaminants from interfering with the bearings 40 or gear assembly 30.

Figure 4:
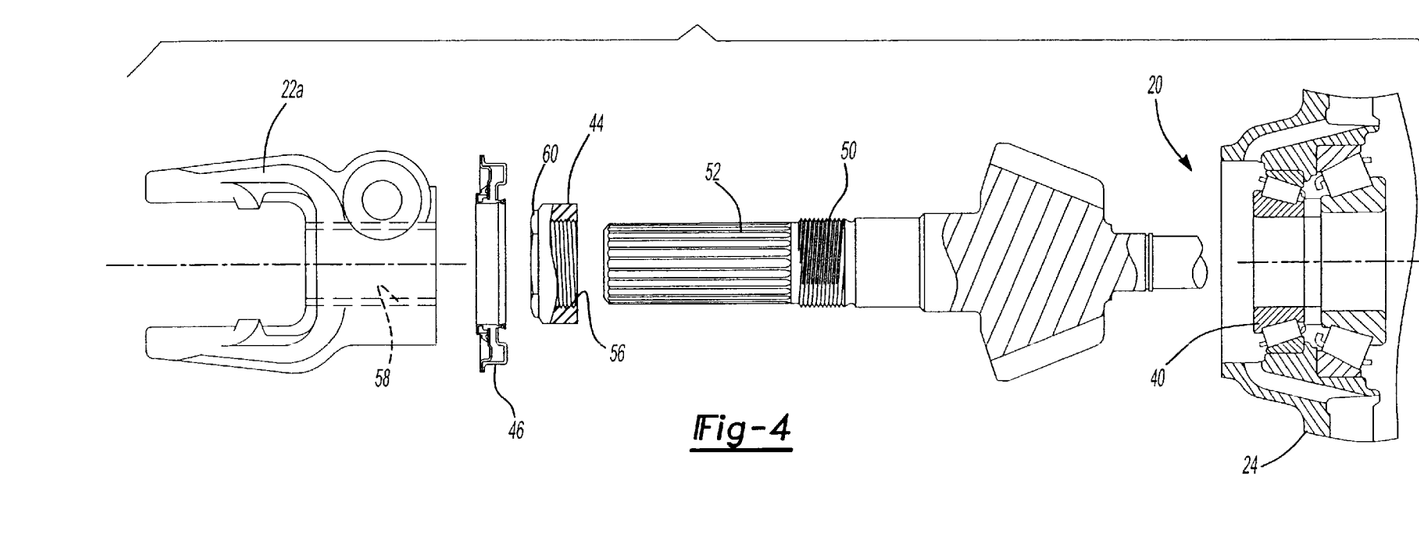
FIG. 4 is an exploded view of the driveline assembly of FIG. 3.

As shown in the exploded view of FIG. 4, the input pinion shaft 18 preferably has a first mounting portion 50 for receiving the retaining ring 44 and a second mounting portion 52 for receiving the yoke member 22. Preferably, the first mounting portion 50 is a threaded exterior surface portion on the shaft 18 and the second mounting portion 52 is a splined exterior surface portion on the shaft 18. The retaining ring 44 includes a threaded inner bore 56 that threadably engages the threaded exterior surface portion 50 on the shaft 18. Preferably, 2 ⅜ fine threads are use for the threaded exterior surface 50 and the threaded inner bore 56, however, other thread sizes could also be used. The yoke member 22a includes a splined inner bore 58 that is received on the splined exterior surface portion 52 of the shaft 18.

The retaining ring 44 is tightened against the bearing assembly 40 to a predetermined torque level to supply a predetermined preload bearing force. The retaining ring 44 preferably includes a hex-head portion 60 to facilitate this operation. The predetermined torque level and bearing preload force vary depending upon the driveline size/capacity and the vehicle application.

To simplify service and assembly, the yoke member 22a can be removed without having to remove the retaining ring 44 from the shaft 18. Additionally, the yoke member 22a can be re-installed without affecting the retaining ring 44. Thus, the proper bearing preload force is applied during initial assembly and is not affected during removal of the yoke member 22a for repair, service, or change-out. When the yoke member 22a is installed on the shaft 18 the retaining ring 44 is positioned between the bearing assembly 40 and the yoke member 22a.

Each of the yoke members 22a, 22b includes a quick connect/disconnect device 62 that permits the yoke member 22a, 22b to be easily removed for repair, replacement, or change-out. The device 62 is easily movable between connect and disconnect conditions.

Figure 5A:
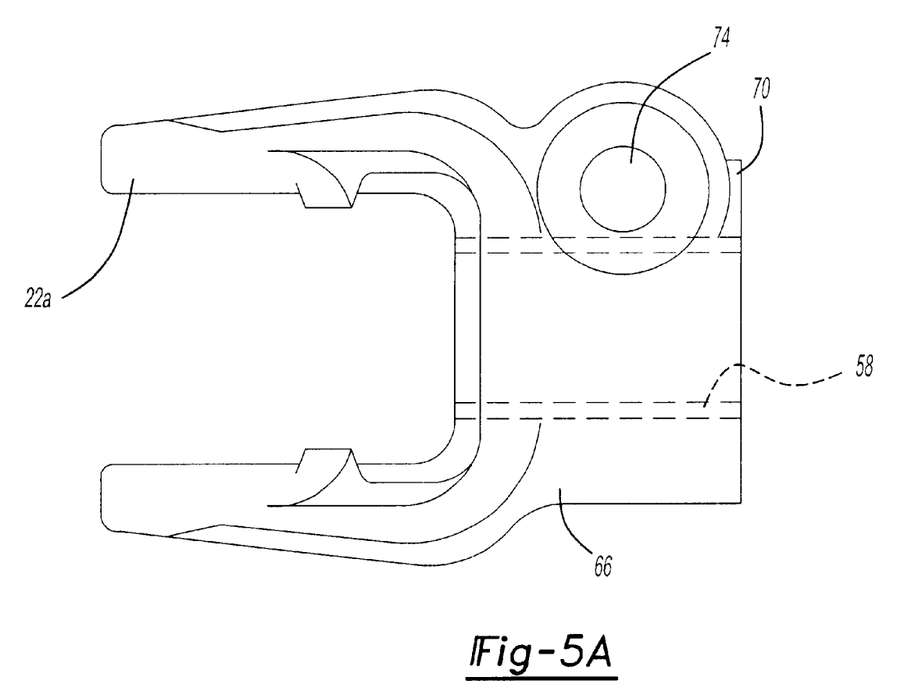
FIG. 5A is a side view of one type of quick connect.
Figure 5B:
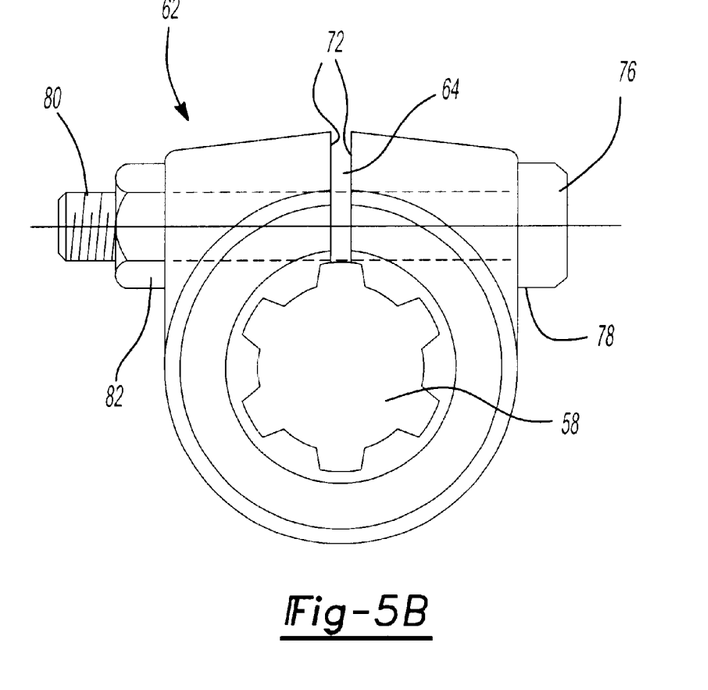
FIG. 5B is an end view of the quick connect of FIG. 5A in an installed position.

In one embodiment, shown in FIGS. 5A–B and shown in FIG. 3 as an example, the device 62 includes a longitudinally extending slot 64 formed in a body portion 66 of the yoke member 22a adjacent to the splined inner bore 58. The slot 64 is preferably open at one end 70 of the yoke member 22a and defines a pair of slot edges 72. A laterally extending thru-hole 74 is formed perpendicular to the slot 64 and the splines. To connect the yoke member 22a to the shaft 18 a clamping member 76 is inserted into the thru-hole 74 to apply a clamping force on the opposing edges 72 of the slot 64 to clamp the yoke member 22a to the shaft 18. To disconnect the yoke member 22a, the clamping force is released. Preferably, the clamping member 76 is a fastener having a head portion 78 engaging one side of the body portion 66 and a threaded end 80 extending outwardly from an opposite side of the body portion 66. A nut 82 is tightened against the opposite side of the body portion 66 to draw the opposing slot edges 72 together to clamp the yoke member 22a on the shaft 18.

Figure 6A:
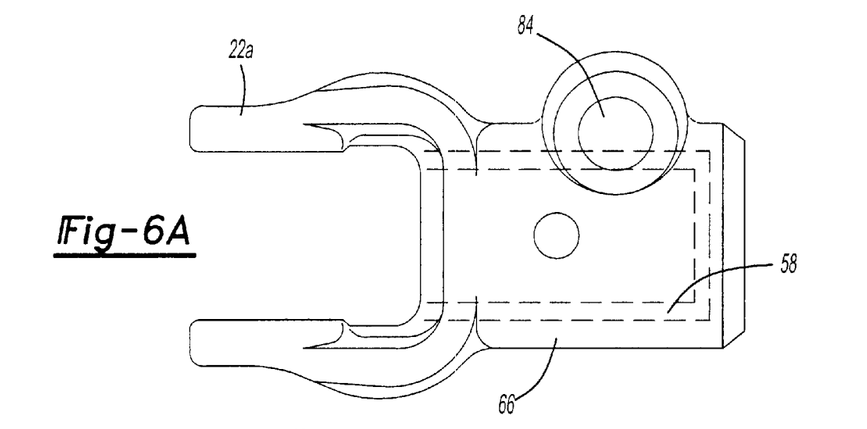
FIG. 6A is a side view of an alternate quick connect.
Figure 6B:
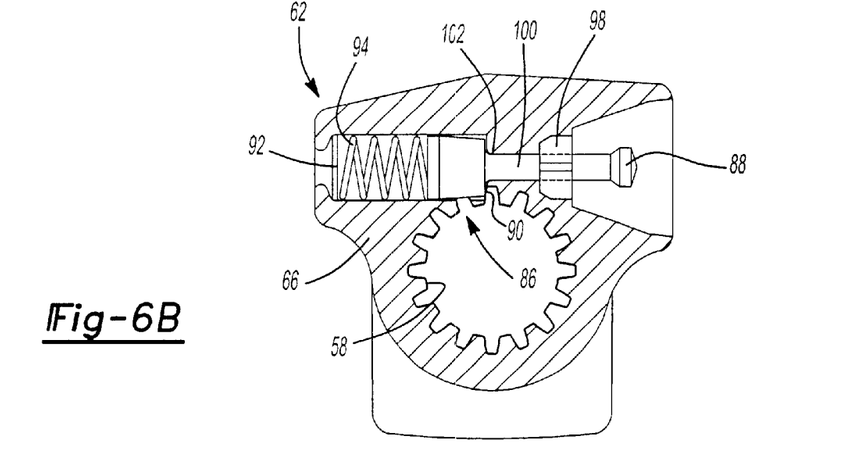
FIG. 6B is a cross-sectional end view of the quick connect of FIG. 6A in installed position.
Figure 6C:
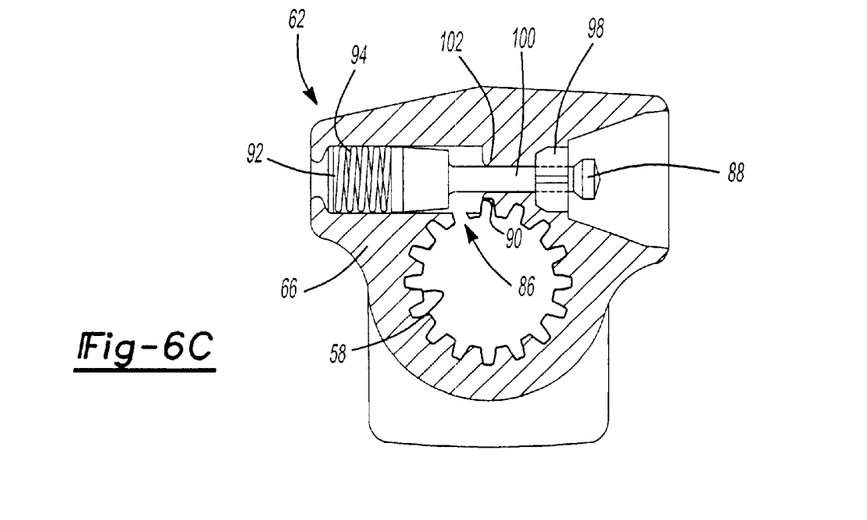
FIG. 6C is a cross-sectional end view of the quick connect of FIG. 6B in a disconnect position.

In another embodiment, shown in FIGS. 6A–C and shown in FIG. 4 as an example, the device 62 includes a laterally extending hole 84 formed in the body portion of the yoke member 22a adjacent to the splined inner bore 58. In this configuration, the splined inner bore 58 is discontinuous, i.e. there is a portion of the bore that does not include splines. This portion of the bore 58 is in the form of a small opening 86 that is in communication with the laterally extending hole 84 of the yoke member 22a. To connect the yoke member 22a to the shaft 18, a pin 88 is biased to engage an edge 90 of the small opening 86 (FIG. 6B) to retain the yoke member 22a on the shaft 18. To disconnect the yoke member 22a, the pin 88 is depressed to disengage the edge 90 of the small opening 86 (FIG. 6C) to permit removal of the yoke member 22a from the shaft 18.

A slug 92 is installed at one end of the hole 84 to provide a fixed surface to support one end of a spring 94. The opposite end of the spring 94 is engaged with an enlarged base portion 96 of the pin 88. A bushing 98 is installed within the hole 84 at a narrowing neck portion 100 of the pin 88. A shoulder 102, formed between the base 96 and neck 100 portions of the pin 88, engages the edge 90 of the small opening 86 to connect the yoke member 22a to the shaft 18. When the pin 88 is depressed to disconnect the yoke member 22a, the pin 88 slides relative to the bushing 98 and compresses the spring 94. This disengages the shoulder 102 from the edge 90, allowing the yoke member 22a to be disconnected.

It should be understood that the quick connect/disconnect devices 62 shown in FIGS. 3–6 could be used for any yoke member 22a, 22b in the driveline 10, 110 assembly. Further, the quick connect/disconnect devices 62 can be used for either a single axle 20 or a tandem axle 120.

Figure 7:
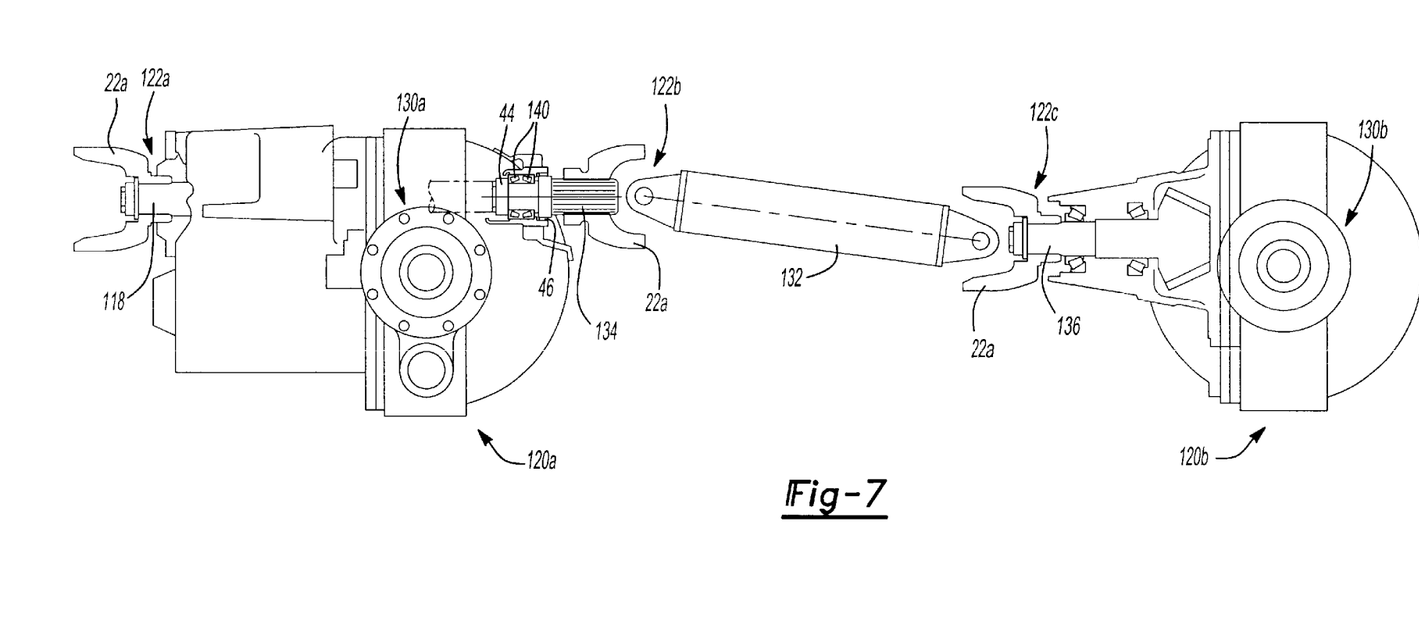
FIG. 7 is a schematic view of a tandem drive axle incorporating the subject invention.

A tandem axle configuration is shown in FIG. 7. In this configuration, the retaining ring 44 is preferably mounted on the output thru-shaft 134 in a similar manner as discussed above with regard to the single drive axle configuration, i.e., the retaining ring 44 is preferably threadably attached to the output thru-shaft 134. The retaining ring 44 is positioned between bearing assembly 140 and the gearing assembly 130a (see FIG. 1B) to retain the bearing assembly 140 at a proper location. The splined attachment between the yoke member 22a and the thru-shaft 134 allows the yoke member 22a to slide relative to the shaft 134 to permit installation of the interaxle driveshaft 132. Preferably, the interaxle driveshaft 132 is a single piece component of fixed length, i.e. is non-telescoping. This configuration facilitates assembly of the driveline 120. One end of the interaxle driveshaft 132 is connected to the rear-rear axle 120b and the opposite end of the interaxle driveshaft 132 is connected to the yoke member 22a, which slides on the output thru-shaft 134 to provide variable length adjustment.

While the sliding yoke member 22a is shown as being used on the output of the forward-rear axle 120a it should be understood that a similar sliding yoke member 22a could be also used on the rear-rear axle 120b. Further, the tandem configuration shown in FIG. 7 can be used with standard hypoid gearing (rear-rear pinion below axle centerline) or with amboid gearing (rear-rear pinion above axle centerline). Additionally, the retaining ring 44 can be used simply to retain a bearing assembly 140 in place or can be used to provide a preload force as discussed above in relation to a single drive axle 20. In a typical tandem axle configuration, only the input pinion shaft 136 to the rear-rear axle 120b requires a preload force for the bearing assembly 140 while the input pinion shaft 118 to the forward-rear axle 120a and the output thru-shaft 134 bearings 140 have end-play configurations.

Also, it should be understood that the separate retaining ring 44 and yoke members 22a can be used on a tandem axle assembly 120 that utilizes a telescoping interaxle driveshaft (not shown) as disclosed in U.S. Pat. No. 5,951,402 assigned to the assignee of the present invention and herein incorporated by reference. The quick connect/disconnect assembly in this configuration would include the interaxle driveshaft with a splined formed tube (also known as the IZAK spline). This assembly would also include two (2) weld yokes and centerparts kits with clamp yokes attached at both ends.

The subject invention simplifies assembly of driveline components in addition to improving performance. Further, service, repair, change-out, and other driveline maintenance operations are simplified with the use of quick connect/disconnect clamping yoke members.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A driveline assembly comprising:
   a first shaft operably coupled to a drive axle, said first shaft having a first mount portion and a second mount portion;
   a bearing supporting said first shaft for rotation within said drive axle;
   a retaining ring mounted on said first mount portion for engagement with said bearing to retain said bearing at a desired location along said first shaft; and
   a yoke member mounted on said second mount portion for coupling said first shaft to a second shaft wherein said drive axle is a tandem drive axle including a forward-rear axle having a first center gear assembly and a rear-rear axle having a second center gear assembly, said forward-rear and rear-rear axles being interconnected via an interaxle driveshaft, said first shaft being a thru-shaft driven by said first center gear assembly and said second shaft being said interaxle driveshaft.

2. An assembly as set forth in claim 1 wherein said retaining ring is tightened against said bearing to a predetermined torque level to achieve a predetermined bearing preload.

3. An assembly as set forth in claim 1 wherein said first mount portion comprises an exterior threaded surface and said retaining ring includes a threaded inner bore for engaging said exterior threaded surface.

4. An assembly as set forth in claim 1 wherein said second mount portion comprises an exterior splined surface and said yoke member includes a splined inner bore for mating engagement with said exterior splined surface.

5. An assembly as set forth in claim 1 wherein said yoke member includes a quick disconnect device for removing said yoke member from said first shaft without removing said retaining ring from said first shaft.

6. An assembly as set forth in claim 5 wherein said quick disconnect device comprises a yoke clamp including at least one longitudinally extending slot, at least one laterally extending thru-hole, and at least one clamping member for insertion in said thru-hole, said clamping member movable between a connect condition and a disconnect condition wherein said clamping member exerts a clamping force on opposing edges of said slot to clamp said yoke member to said first shaft in said connect condition and releases said clamping force to permit removal of said yoke member from said first shaft in said disconnect condition.

7. An assembly as set forth in claim 5 wherein said quick disconnect device comprises a laterally extending hole for receiving a spring loaded pin that is movable between a connect condition and a disconnect condition and wherein said yoke member includes a discontinuous splined inner bore having a small opening in communication with said laterally extending hole, said spring loaded pin being resiliently biased to engage an edge of said small opening to retain said yoke member on said first shaft in said connect condition and said spring loaded pin being depressible to disengage said edge of said small opening to permit removal of said yoke member from said first shaft in said disconnect condition.

8. An assembly as set forth in claim 1 wherein said interaxle driveshaft has a predetermined fixed length.

9. An assembly as set forth in claim 8 wherein said interaxle driveshaft is comprised of a single piece.

10. An assembly as set forth in claim 9 wherein said second mount portion comprises an exterior splined surface and said yoke member includes a splined inner bore in sliding engagement with said exterior splined surface such that said yoke member is adjustable relative to said thru-shaft to a predetermined position along said thru-shaft.

11. An assembly as set forth in claim 1 including a seal assembly supported on said thru-shaft between said bearing and said yoke member.

12. An assembly as set forth in claim 1 wherein said yoke member is separable from said retaining ring.

13. An assembly as set forth in claim 1 including a first input pinion shaft for driving said first center gear assembly and a second input pinion shaft for driving said second center gear assembly wherein said first center gear assembly is operably coupled to an output from said forward-rear axle, said output comprising said thru-shaft, wherein said thru-shaft drives said interaxle driveshaft and said interaxle driveshaft drives said second input pinion shaft.

14. A driveline assembly comprising:
a first shaft operably coupled to a drive axle, said first shaft having a first mount portion comprising a threaded exterior surface and a second mount portion comprising a splined exterior surface wherein said drive axle is a tandem drive axle including a forward-rear axle having a first center gear assembly and a rear-rear axle having a second center gear assembly, said forward-rear and rear-rear axles being interconnected via an interaxle driveshaft, said first shaft being a thru-shaft driven by said first center gear assembly;
a bearing supporting said thru-shaft for rotation within said drive axle;
a retaining ring having a threaded inner bore for threadably engaging said threaded exterior surface of said first shaft such that said retaining ring engages said bearing to retain said bearing at a desired location along said first shaft; and
a yoke member having a splined inner bore for mating engagement with said splined exterior surface of said thru-shaft, said yoke member for coupling said thru-shaft to a second shaft comprising said interaxle driveshaft that is of a predetermined fixed length with said yoke member being adjustable relative to said thru-shaft to a predetermined position along said thru-shaft wherein said yoke member includes a quick disconnect device for removing said yoke member from said thru-shaft without removing said retaining ring from said thru-shaft.

15. An assembly as set forth in claim 14 wherein said retaining ring is tightened against said bearing to a predetermined torque level to achieve a predetermined bearing preload.

16. An assembly as set forth in claim 14 including a seal assembly supported on said thru-shaft between said bearing and said yoke member.

17. An assembly as set forth in claim 14 including a first input pinion shaft for driving said first center gear assembly and a second input pinion shaft for driving said second center gear assembly wherein said first center gear assembly is operably coupled to an output from said forward-rear axle, said output comprising said thru-shaft, wherein said thru-shaft dives said interaxle driveshaft and said interaxle driveshaft dives said second input pinion shaft.

* * * * *

UNITED STATES PATENT AND TRADEMARK OFFICE
CERTIFICATE OF CORRECTION

PATENT NO. : 6,761,237 B2
DATED : July 13, 2004
INVENTOR(S) : Brissette et al.

It is certified that error appears in the above-identified patent and that said Letters Patent is hereby corrected as shown below:

Column 8,
Lines 53 and 54, "dives" should be -- drives --

Signed and Sealed this

Seventeenth Day of August, 2004

JON W. DUDAS
*Acting Director of the United States Patent and Trademark Office*